United States Patent Office 3,187,042
Patented June 1, 1965

3,187,042
N-ALKOXY BENZAMIDES
Sidney B. Richter, Chicago, Ill., assignor to Velsicol Chemical Corporation, Chicago, Ill., a corporation of Illinois
No Drawing. Filed Jan. 4, 1962, Ser. No. 164,405
17 Claims. (Cl. 277—11)

This invention relates to new compositions of matter. In particular this invention relates to new herbicidally active compositions.

A long established problem is the uncontrolled growth of plants. In some instances, this growth takes place in open areas in which there is no desired vegetation. Thus for example, vacant lots and railroad right-of-ways generally contain such growth. In combatting these weeds it is necessary to use a product having broad herbicidal properties without regard as to its effect on surrounding plant growth.

In other instances of perhaps greater economic importance is the growth of undesired plants in areas wherein desired plants similarly grow. In this case the presence of the weeds causes great injury since it prevents the normal growth of the planted item and decreases the productivity of the land. Here it is necessary to use herbicidally active products which will not injure the economic plants but will control and destroy the weeds. It is extremely difficult if not impossible to devise a single material for all purposes since the type of plants which are weeds on one instance can in another usage be a desired crop. Accordingly there is a never ending need for new herbicides especially those which are selective in that they will only adversely affect the growth of the weeds.

Unexpectedly it has been found that the compositions of the present invention possess superior herbicidal activity. The compositions of the present invention have the following chemical formula

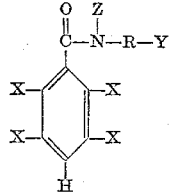

wherein X is selected from the group consisting of lower alkyl, hydrogen, halogen, lower alkoxy and nitro, provided that a maximum of 2 of the X are hydrogen, a maximum of one X is lower alkoxy and a maximum of one X is nitro.

R is selected from the group consisting of sulfur and oxygen.

Y is an unsubstituted hydrocarbon radical containing from 1 to 4 carbon atoms.

Z is selected from the group consisting of hydrogen and unsubstituted hydrocarbon radicals containing from 1 to 4 carbon atoms.

As can be seen from the foregoing structural representations, these compositions have unique configurations containing as critical portions a specifically substituted phenyl nucleus and a specifically substituted amide group.

While the method of preparing the present compounds is not critical to the present invention which is directed to the compositions and their use as herbicides, the present compounds can be obtained by reacting a suitable substituted benzoyl chloride and an appropriately substituted amine.

The amine reactant necessary for this reaction is substituted in accordance with the desired R, Y and Z substituents of the final product since the substituents are not altered by the reaction with the phenyl acid chloride. Thus its formula in NH(RY)Z. Suitable amines can be prepared, for example, by the reduction of the corresponding oximes as described by Jones and Major, J. Am. Chem. Soc., vol. 52, pp. 669–79 (1930). Amines of the type HN(Z)(SY) have been disclosed in United States Patent 2,877,749, granted March 17, 1959, and can be prepared, for example, by treating a sulfenyl halide with an equimolar amount of an amine in the presence of an equimolar amount of aqueous NaOH as shown in United States Patent 2,520,400, granted August 29, 1950.

The substituted amine can be used conveniently in the form of one of its acid salts, such as the hydrochloride or sulfate, which will often be soluble in water. The free amine can be released in the reaction by the addition of a mild base, such as sodium carbonate, potassium carbonate, or the like.

Similarly the required acid chloride reactant has the formula

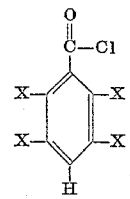

wherein the X substituents are identical to the X substituents of the final product. Thus in order to obtain a particular compound of the present invention a selection must be made of the specific amine and acid chloride reactants containing the required R, X, Y and Z substituents. This reaction can be performed at various temperatures, preferably at reflux temperature. Inert solvent can be used to facilitate this reaction. Such solvents as the lower paraffins are acceptable and other solvents provided they are inert, such as benzene, are satisfactory. Similarly the process can be performed at atmospheric pressure, although pressures below or above are useful.

The reaction may be complete in less than one hour, but frequently several hours of reaction time will be required. The product can be isolated, for example, by removing the solvent from the organic layer of the reaction mixture. While the product which is obtained in this manner is often sufficiently pure for pesticidal purposes as such, it can be purified by recrystallization, distillation, chromatography, or other techniques known to the art.

The following examples illustrate this reaction, it being understood that acid chlorides and amines useful as reactants possessing the desired R, X, Y and Z substituents can be substituted for the reactants of the following examples.

EXAMPLE 1

*Preparation of N-methoxy-N-methyl-2,3,6-trichlorobenzamide*

2,3,6-trichlorobenzoylchloride (24.4 grams; 0.1 mol) is placed in a glass reaction flask equipped with stirrer, thermometer, reflux condenser and heating mantle and containing benzene (200 ml.). Anhydrous N-methoxy-N-methyl amine (12.2 grams; 0.2 mol) is added with continuous stirring and the mixture is allowed to reflux for about 3 hours. After cooling the desired product is recovered by filtration.

EXAMPLE 2

*Preparation of N,2-dimethoxy-N-methyl-3,5,6-trichlorobenzamide*

2-methoxy-3,5,6-trichlorobenzoylchloride (27.4 grams; 0.1 mol) is placed in a glass reaction flask equipped with stirrer, reflux condenser, thermometer and heating mantle and containing benzene (200 ml.). Anhydrous N-methoxy-N-methyl amine (12.2 grams; 0.2 mol) is added with continuous stirring and the mixture is allowed to reflux for about 3 hours. After cooling the desired product is recovered by filtration.

EXAMPLE 3

*Preparation of N,2-dimethoxy-N-methyl-3,6 dichlorobenzamide*

2-methoxy-3,6-dichlorobenzoylchloride (24.0 grams; 0.1 mol) is placed in a glass reaction flask equipped with stirrer, thermometer, reflux condenser and heating mantle and containing benzene (200 ml.). Anhydrous N-methoxy-N-methyl amine (12.2 grams; 0.2 mol) is added with continuous stirring and the mixture is allowed to reflux for about 3 hours. After cooling the desired product is recovered by filtration.

EXAMPLE 4

*Preparation of N-methoxy-N-methyl-2-nitro-3,6-dichlorobenzamide*

2-nitro-3,6-dichlorobenzoyl chloride (23.9 grams; 0.1 mol) is placed in a glass reaction flask equipped with stirrer, thermometer, reflux condenser and heating mantle and containing benzene (200 ml.). Anhydrous N-methoxy-N-methyl amine (12.2 grams; 0.2 mol) is added with continuous stirring and the mixture is allowed to reflux for about 3 hours. After cooling the desired product is recovered by filtration.

As previously indicated the amine and acid chloride reactants in the foregoing examples can be appropriately substituted in order to obtain the various compounds of the present invention. Thus, e.g., by using N-methoxy amine in Example 1 as a substitute for N-methoxy-N-methyl amine there is obtained N-methoxy-2,3,6-trichlorobenzamide; by using N-propoxy-N-propylamine as a substitute for N-methoxy-methyl amine in Example 2 there is obtained N,2-dimethoxy-3,5,6-trichlorobenzamide; by using N-allyl-N-methyl amine in Example 3 as a substitute for N-methoxy-N-methyl amine there is obtained N-allyloxy-N-methyl-2-methoxy-3,6-dichlorobenzamide; and by using N-methyl-mercapto-N-methyl amine in Example 4 as a substitute for N-methoxy-N-methyl amine there is obtained N-methoxy-mercapto-N-methyl-2-nitro-3,6-dichlorobenzamide.

Compounds within the scope of the present invention include although are not limited to the following:

N-methoxy-2,5-dichlorobenzamide
N-methoxy-3,6-dichlorobenzamide
N-methoxy-2,6-dichlorobenzamide
N-ethoxy-2,6-dichlorobenzamide
N-butoxy-2,5-dichlorobenzamide
N,2-dimethoxy-3,6-dichlorobenzamide
N,2-dimethoxy-3,5-dichlorobenzamide
N-ethoxy-N-methyl-2-methoxy-3,6-dichlorobenzamide
N-ethoxy-N-ethyl-3-methoxy-2,6-dichlorobenzamide
N-isopropoxy-N-methyl-2-ethoxy-3,5,6-trichlorobenzamide
N-allyloxy-2-methoxy-3,6-dichlorobenzamide
N-ethoxy-N-ethyl-2-butoxy-3,5,6-trichlorobenzamide
N,2-dimethoxy-N-methyl-5-methyl-3,6-dichlorobenzamide
N,2-diisopropoxy-N-ethyl-2-nitro-3,5-dichlorobenzamide
N,2-diisopropoxy-6-propyl-3,5-dichlorobenzamide
N-butoxy-N-ethyl-2-nitro-3,5-dichlorobenzamide
N,3-dimethoxy-2-chlorobenzamide
N,3-dimethoxy-N-methyl-5-chlorobenzamide
N,2-diethoxy-N-ethyl-6-chlorobenzamide
N,2-dipropoxy-N-methyl-5-ethyl-3-chlorobenzamide
N-ethoxy-N-ethyl-2-isopropoxy-5,6-dibromobenzamide
N,2-dimethoxy-N-methyl-3,6-dibromobenzamide
N,2-dimethoxy-N-methyl-3,5,6-tribromobenzamide
N-propoxy-N-butyl-3-ethoxy-2,6-diiodobenzamide
N-ethoxy-N-ethyl-2-butoxy-3,5,6-triiodobenzamide
N,2-dimethoxy-N-methyl-3-methoxy-5,6-diodobenzamide
N,2-dimethyl-N-methoxy-3,6-dichlorobenzamide
N-methoxy-N-methyl-2,3,5,6-tetrachlorobenzamide For practical use as pesticides, the compounds of this invention are generally incorporated into pesticidal compositions which comprise an inert carrier and a pesticidally toxic amount of such a compound. Such pesticidal compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, gypsum, calcium carbonate, dolomite, pyrophyllite, pumicite, ground walnut shell, and the like. Granular formulations can be prepared by impregnating the compound, usually dissolved in a suitable solvent, on to and into granulated carriers such as the attapulgites or the vermiculites, usually of a particle size range of from about 0.3 to 1.55 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid pesticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents. A typical emulsifiable concentrate formulation is illustrated in the following example, in which the quantities are in parts by weight.

*Example 5*

| | Percent |
|---|---|
| Product of Example 1 | 25 |
| Aromatic polyethylene glycol ether emulsifier | 5 |
| Xylene | 70 |

The emulsifiable concentrate can be prepared by dissolving the product of Example 1 in the xylene, gentle heating being used if necessary. The emulsifier is then added, and the mixture is stirred until homogeneous. The resulting concentrate can be diluted with water to give the desired concentration of the active compound for application to the site of the pest infestation.

The pesticides of this invention can be applied in any manner recognized by the art. The concentration of the new compounds of this invention in the pesticidal compositions will vary greatly with the type of formulation and the purpose for which it is designed, but generally the pesticidal compositions will comprise from about 0.05 to about 95% by weight of the active compounds of this invention. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including summer annuals such as pigweed, lambsquarters, ragweed, yellow and green foxtail, and crabgrass; winter annuals such as chickweed, wild mustard, shepherdspurse, and penny cress; biennials such as wild carrot and great burdock; and perennials such as quackgrass, Johnson grass, Canada thistle, hedge bindweed, Bermuda grass, and sheep sorrel. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of only a few ounces of an active compound per acre may be sufficient for good control of a light infestation of weeds growing under adverse conditions, the application of more than one pound of active compound per acre may be required for good control of a dense infestation of hardy weeds growing under favorable conditions.

The herbicidal toxicity of the new compounds of this invention can be illustrated by any of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

I claim:
1.

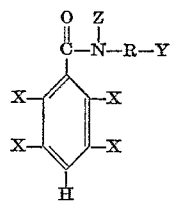

wherein X is selected from the group consisting of lower alkyl, hydrogen, halogen, lower alkoxy and nitro provided that a maximum of 2 of the X are hydrogen, a maximum of 1 of the X is lower alkoxy and a maximum of 1 of the X is nitro, R is selected from the group consisting of sulfur and oxygen, Y is alkyl of 1 to 4 carbon atoms, Z is selected from the group consisting of hydrogen and alkyl of 1 to 4 carbon atoms.

2. N-methoxy-N-methyl-2,3,6-trichlorobenzamide.
3. N,2-dimethoxy-N-methyl-3,6-dichlorobenzamide.
4. N,2-dimethoxy-N-methyl-3,5,6-trichlorobenzamide.
5. N,3-dimethoxy-N-methyl-2,6-dichlorobenzamide.
6. N,2-dimethoxy-3,6-dichlorobenzamide.
7. N,2-dimethoxy-3,5,6-trichlorobenzamide.
8. N,3-dimethoxy-N-methyl-2,5-dichlorobenzamide.
9. N-methoxy-N-methyl-2-nitro-3,6-dichlorobenzamide.
10. N - ethoxy - N - ethyl - 2 - methoxy - 3,6 - dichlorobenzamide.
11. N-ethoxy-2-methoxy-3,5,6-trichlorobenzamide.
12. N - butoxy - N - methyl - 2 - methoxy - 3,5,6 - trichlorobenzamide.
13. N - propoxy - N - methyl - 2 - methoxy - 3,6 - dichlorobenzamide.
14. N,2-dimethoxy-3-chlorobenzamide.
15. N,2 - dimethoxy - N - 3 - dimethyl - 5,6 - dichlorobenzamide.
16. N,2-dimethoxy-5-methyl-3,6-dichlorobenzamide.
17. N,2-dimethoxy-N,3-dimethyl-6-chlorobenzamide.

References Cited by the Examiner
UNITED STATES PATENTS

| 2,723,192 | 11/55 | Todd | 71—2.6 |
| 2,726,150 | 12/55 | Wolter | 71—2.6 |
| 2,895,992 | 7/59 | Ohnacker et al. | 260—559 |
| 3,013,051 | 12/61 | Richter | 260—559 |
| 3,027,407 | 3/62 | Major et al. | 260—559 |

OTHER REFERENCES

Tiengo: Chemical Abstracts, vol. 54, p. 4917 (1960).
Fuller et al.: J. Chem. Soc. (London), pages 963–969 (p. 967 relied on) (1947).
Gheorghiu et al.: Chem. Abstracts, vol. 52, pages 17509–17510 (1958).

IRVING MARCUS, *Primary Examiner.*

DUVAL T. McCUTCHEN, WALTER A. MODANCE,
*Examiners.*